US008582881B2

(12) United States Patent
Damkat et al.

(10) Patent No.: US 8,582,881 B2
(45) Date of Patent: Nov. 12, 2013

(54) METHOD AND APPARATUS FOR MODIFYING AN IMAGE BY USING A SALIENCY MAP BASED ON COLOR FREQUENCY

(75) Inventors: Chris Damkat, Eindhoven (NL);
Gerard De Haan, Eindhoven (NL);
Paul Michiel Hofman, Neunen (NL);
Dipti Kapadia, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 105 days.

(21) Appl. No.: 13/256,845

(22) PCT Filed: Mar. 24, 2010

(86) PCT No.: PCT/IB2010/051282
§ 371 (c)(1),
(2), (4) Date: Sep. 15, 2011

(87) PCT Pub. No.: WO2010/109419
PCT Pub. Date: Sep. 30, 2010

(65) Prior Publication Data
US 2012/0002107 A1    Jan. 5, 2012

(30) Foreign Application Priority Data
Mar. 26, 2009  (EP) .................................. 09156321

(51) Int. Cl.
*G06K 9/00*     (2006.01)
(52) U.S. Cl.
USPC ............ 382/170; 382/162; 382/165; 382/168

(58) Field of Classification Search
USPC ......... 382/162, 165, 168, 169, 170, 132, 133;
345/582; 600/109, 128, 160, 476
See application file for complete search history.

(56) References Cited

U.S. PATENT DOCUMENTS

| | | | |
|---|---|---|---|
| 5,579,402 A * | 11/1996 | Hayen | 382/132 |
| 7,162,102 B2 | 1/2007 | Cahill et al. | |
| 7,171,058 B2 | 1/2007 | Luo | |
| 7,268,788 B2 * | 9/2007 | Shain et al. | 345/582 |
| 7,324,693 B2 | 1/2008 | Chen | |
| 7,914,442 B1 * | 3/2011 | Gazdzinski | 600/109 |
| 2007/0122039 A1 | 5/2007 | Zhang et al. | |
| 2007/0286499 A1 | 12/2007 | Freiburg et al. | |

FOREIGN PATENT DOCUMENTS

EP    1936566 A1    6/2008
EP    1968008 A2    9/2008

OTHER PUBLICATIONS

Wang et al: "Optimized Scale-And-Stretch for Image Resizing"; ACM Transactions on Graphics, Proceedings of ACM SIGGRAPH, vol. 27, Issue 5, Dec. 208, pp. 1-8.

(Continued)

*Primary Examiner* — Anh Hong Do
(74) *Attorney, Agent, or Firm* — Shimokaji & Assoc., PC

(57) ABSTRACT

A method for modifying an image being defined by a matrix of pixels comprises: •calculating (1) a color frequency distribution of the matrix of pixels; •defining (3) for each pixel an energy value as a weighted function of the color frequency of the pixel, so as to define an image saliency map; •transforming (5) the image, said transformation being based on the pixel energy values. A computer software product to apply the method, an apparatus and a TV set are also disclosed.

15 Claims, 2 Drawing Sheets

(56) References Cited

OTHER PUBLICATIONS

Rubinstein et al: "Improved Seam Carving for Video Retargeting"; ACM Transactions on Graphics, SIGGRAPH 2008, vol. 27, Issue 3, Aug. 2008, p. 1-9.
Wolf et al: "Non-Homogeneous Content-Driven Video-Retargeting"; IEEE 11th International Conference on Computer Vision, Oct. 2007, ICCV-07, pp. 1-6.
Kapadia, D.: "Improvements to Seam Carving: A Content Aware Image Resizing Technique"; Technical Note TN-1, Jul. 2008, Technical University of Eindhoven, 53 Page Document.
Avidan et al: "Seam Carving for Content-Aware Image Resizing"; ACM Transactions on Graphics, vol. 26, No. 3, Article 10, Jul. 2007, pp. 10-1-10-19.
Itti et al: "A Model of Saliency-Based Visual Attention for Rapid Scene Analysis"; IEEE Transactions on Pattern Analysis and Machine Intelligence, vol. 20, vol. 11, Nov. 1998, pp. 1254-1259.
Setlur et al: "Retargeting Images and Video for Preserving Information Saliency"; IEEE Computer Society, Sep./Oct. 2007, pp. 80-88.
Hwang et al: "Content-Aware Image Resizing Using Perceptual Seam Carving With Human Attention Model"; IEEE International Conference on Multimedia and Expo, 2008, pp. 1029-1032.
Liu et al: "Region Enhanced Scale-Invariant Saliency Detectors"; 2006 IEEE International Conference on Multimedia and Expo, Jul. 2006, pp. 1477-1480.
Hou et al: "Thumbnail Generation Based on Global Saliency"; Chapter 172 of "Advances in Cognitive Neurodynamics", pp. 999-1003, Springer Science + Business Media B.V. 2008.

\* cited by examiner

METHOD AND APPARATUS FOR MODIFYING AN IMAGE BY USING A SALIENCY MAP BASED ON COLOR FREQUENCY

FIELD OF THE INVENTION

The invention relates to the field of image modification and more particularly to a method and an apparatus using a saliency map based on color frequency for modifying a picture. A computer software product to apply the method and a TV set are also disclosed.

BACKGROUND OF THE INVENTION

The recent developments in the field of display technologies have seen great diversity in display sizes and same content is required to be displayed in different dimensions and aspect ratio for different devices. Typically, videos recorded for the old 4:3 ratio of CRT television are now displayed on 16:9 wide screen TV.

There is thus a need of algorithm that could adapt images to displays different than originally intended for.

Basic image resizing techniques are linear scaling or cropping. However, these techniques lead to image quality degradation due to loss of details, anisotropic squish or stretch, suppression of region outside the cropping window, etc.

Hence effective adaptation of images considering the image content is needed. Such an intelligent adaptation is known in the art as "Image retargeting" or "Video retargeting" if video is considered.

For modifying "intelligently" an image, numerous methods use a saliency map which defines an information value for each pixel.

For instance, document EP 1 968 008 discloses a method for content-aware image retargeting which is known as "Seam Carving". A saliency map, also called an energy image, from a source image is generated according to an energy function, often a luminance gradient function. From the energy image, one or more seams are determined according to a minimizing function such that each seam has a minimal energy. Each seam is applied to the source image by suppressing or duplicating the seam to obtain a target image that preserves content but with a different aspect ratio.

In this document, a seam is a contiguous path of pixels going through the image from one side to the opposite side.

This technique was extended to video retargeting by defining a 2D seam surface in a 3D video space-time cube. The intersection of the surface with each frame defines a seam in the sense of the document. The manifold seam surface allows the seam to change adaptively over time, maintaining temporal coherence.

SUMMARY OF THE INVENTION

Although seam carving gives generally good results on images, there are some image categories where it fails, giving undesired results. For instance, when multiple regions of interest are separated by high frequency textured area, seam carving misinterprets the texture as region of interest and seams are wrongly selected in regions which should be preserved.

It would thus be advantageous to achieve a method for modifying an image which improves seam carving to obtain better results with different image categories.

To better address one or more concerns, in a first aspect of the invention a method for modifying an image, said image being defined by a matrix of pixels, comprises:
  calculating a color frequency distribution of the matrix of pixels;
  defining for each pixel an energy value as a weighted function of the color frequency of the pixel, so as to define an image saliency map;
  transforming the image, the transformation being based on the pixel energy values.

The energy function is thus based on the assumption that a person looks more attentively at area comprising infrequent colors.

In a particular embodiment,

The transformation is a retargeting modification of the image into a retargeted image having a different aspect ratio.

In order to preserve the parts of an image with rare colors, which attract human gaze, a color histogram is used to analyze distribution of colors. The color channels are discretized into bins and the pixels are weighted in inverse proportion to the histogram bin they belong to.

As focus of an image or regions of interest are generally around the centre in most images and a distortion of objects towards the boundaries of the images is less annoying compared with distortion around the centre, the energy of every pixel with respect to its spatial position is weighted in order to give a greater importance to the visually salient features in the centre. Particularly, the pixel energy value is weighted by the inverse of the distance of the pixel from the image center.

Other parameters may be used as part of the energy function. For instance, a smoothed image is calculated by applying a low pass filter to the image and the pixel energy value is weighted by a gradient function applied to the corresponding pixel of the smoothed image. Particularly, the low pass filter may be a 2D Gaussian smoothing function with a smoothing which may be comprised between 4 and 6. And the gradient function may be based on the pixel luminance or the pixel chrominance.

The energy function may be used into seam carving by selecting a seam of least energy value among a set of seams wherein a seam is a continuous path of pixels from one side to the opposite side of the image and its energy value is equal to the sum of the energy value of its pixel and suppressing or duplicating the selected seam in the image to modify its aspect ratio.

Depending on the type of image, a particular embodiment may be preferred as easier to adapt or as giving a better result. Aspects of these particular embodiments may be combined or modified as appropriate or desired, however.

In a second aspect of the invention, a computer software product stored on a recording media comprises a set of instructions to enable a computer to practice the method here above when the computer executes the set of instructions.

In a third aspect of the invention, an apparatus for modifying an image being defined by a matrix of pixels, comprises:
  a first calculator of a color frequency distribution of the image; connected to
  a second calculator of an energy value for each pixel, said energy value being a weighted function of the color frequency of the pixel, so as to define an image saliency map; connected to
  an image modifier for transforming the image, the transformation being based on the pixel energy value.

In a fourth aspect of the invention, a TV set comprises a display with a first aspect ratio and an input device for receiving at least a source image. The TV further comprises an apparatus as described here above for modifying the source image into a target image having the first aspect ratio to be displayed.

These and other aspects of the invention will be apparent from and elucidated with reference to the embodiment described hereafter, and given as example only, where:

In the following description, image modification will be focused to retargeting however the disclosed energy functions may be used in other image transformation where it is important to differentiate areas containing high value information from other areas acting as background. For instance, image modification may consist to blur the background to highlight the main objects, or as a first step in an image recognition method.

The description will use seam carving as a typical retargeting method but it is well known by the man skilled in the art other retargeting method using saliency map. For instance, document EP 1 936 566 discloses a high-level saliency map to create thumbnail image.

Figure 1:
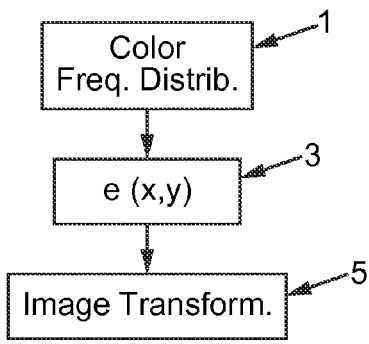
FIG. 1 is a flow chart of a method according to one embodiment of the present invention.

Typically, FIG. 1, a method for modifying an image being defined by a matrix of pixels, comprises:

- calculating, step 1, a color frequency distribution of the matrix of pixels;
- defining, step 3, for each pixel an energy value as a weighted function of the color frequency of the pixel, so as to define a saliency map of said image;
- transforming, step 5, the image, the transformation being based on the pixel energy values.

Indeed, human scene categorization suggests that humans rely on local, region-based information as much as on global, configural information. In addition, humans seem to integrate both types of information for intact scene categorization. Objects seek attention depending on surrounding context in which they occur. Colors which are rare in the image stand out to attract human gaze.

To preserve the parts of an image with rare colors, a color histogram to analyze distribution of colors in an image is used. For instance, each of the Cr and Cb channels are discretized into 10 bins. A two dimensional (2D) normalized CbCr-histogram of an image is produced counting the number of image pixels in each bin. Pixels in the image are then weighted in inverse proportion to the histogram bin they belong to. To be more specific, if pixel at (x, y) falls in a bin whose histogram value is given by H, then energy due to CbCr-histogram analysis is given by:

$$e_H(x, y) = \frac{1}{H(I_{Cb(x,y)}, I_{Cr(x,y)}) * 100} \quad (1)$$

when $H(I_{Cb(x,y)}, I_{Cr(x,y)}) > 0.015$ $$e_H(x, y) = \frac{1}{0.015 * 100}$$

when $H(I_{Cb(x,y)}, I_{Cr(x,y)}) \leq 0.015$

Note here the energy for each pixel is defined in the range of [0-1]. As rare colors are emphasized, but not really distinguished between their exact proportions in an image, maximum cut-off histogram energy of 0.66 is used. All the rare pixels with $H(I_{Cb(x,y)}, I_{Cr(x,y)}) \leq 0.015$ will get a maximum weight of 0.66. This has the advantage to avoid infinitely high $e_H$ values possible due to very small histogram values in the denominator in equation 1. Moreover by defining such a cut-off for histogram energy, when combining histogram energy with gradient energy, the edges will still remain more important than the rare color pixels.

Seam carving is achieved by reducing, or enlarging, the width, or the height, of the image by one pixel at a time. The image dimension is reduced or enlarged by gracefully carving out or inserting pixels along the height or width of the image. Seam carving is based on finding least noticeable connected seams of pixels. While reducing image height or width, removing such a continuous seam would preserve the visual perception by not distorting regions of interest. Similarly while enlarging; duplicating those less noticeable seams will not much change the regions of interest, maintaining the original view of the image.

As an illustration, let assume we want to reduce the width of the image. The basic idea of seam carving is to remove unnoticeable pixels which blend with their surroundings. Hence the algorithm defines an energy function for each pixel which basically reflects how visually important the pixel is. It appears that the algorithm depends on luminance channel to define the energy model. So let I be a grayscale conversion of n×m image with n rows and m columns, and e(x, y) denote the energy of pixel at horizontal position x and vertical position y. Then seam carving defines the energy function as in equation 1, which is the sum of absolute gradient in horizontal and vertical direction (L1-norm).

$$e(x, y) = \left|\frac{\partial I(x, y)}{\partial x}\right| + \left|\frac{\partial I(x, y)}{\partial y}\right| \quad (2)$$

Figure 2A:
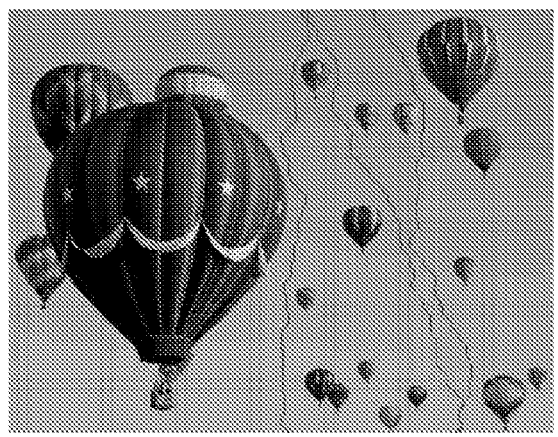
FIGS. 2A, 2B, 2C are illustrations of a picture with its energy map and its cumulative energy map.
Figure 2B:
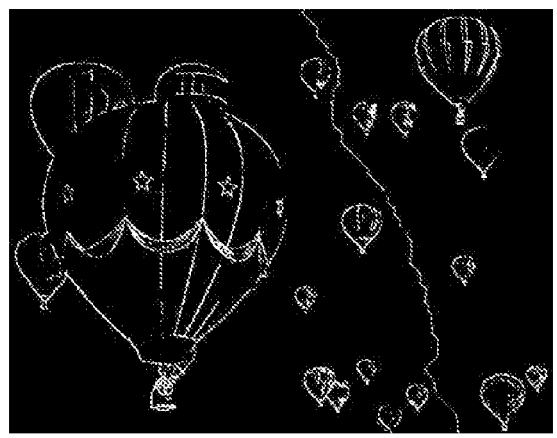

FIG. 2B visualizes this energy function for the picture of FIG. 2A: the low energy pixels are the darker pixels or the pixels which can be removed without being noticed.

However randomly removing pixels from the image could distort its shape. Thus equal number of pixels is required to be removed from every row or column to preserve the rectangular shape. Taking all this in account, a seam is defined as a connected path of pixels on a single image from top to bottom (or left to right). More formally a vertical seam is defined as:

$$s^x = \{S_i^x\}_{i=1}^n = \{(x(i), i)\}_{i=1}^n s.t. \forall i, |x(i)-x(i-1)| \leq 1 \quad (3)$$

Where x is a mapping x: [1, ..., n]→[1, ..., m] from rows to columns. That is, a vertical seam is an 8-connected path of pixels in the image from top to bottom; containing one, and only one, pixel in each row of the image. FIG. 2B shows some vertical seams.

Similarly, if y is a mapping y: [1, ..., m]→[1, ..., n], then a horizontal seam is defined as:

$$s^y = \{S_j^y\}_{j=1}^m = \{(y(j), j)\}_{j=1}^m s.t. \forall j, |y(j)-y(j-1)| \leq 1 \quad (4)$$

With the goal of removing pixels with low energy, seams with low energy are searched for. For that purpose, a cost of seam or energy of seam is defined as:

$$E(s) = \sum_{i=1}^n e(I(s_i)) \quad (5)$$

Optimal seam s* is then the seam which minimizes the seam cost. Mathematically s* is defined in equation 6:

$$s^* = \min_s E(s) = \min_s \sum_{i=1}^{n} e(I(s_i)) \quad (6)$$

Dynamic programming with bottom-up approach is used to find optimal seam. Energy along the height of the image from top to bottom is integrated. Since the seam has to be connected, the cumulative minimum energy at each pixel combining it with one of the three neighbors in previous row is computed. In first step, the image is scanned from second to last row and for every pixel position (i, j), cumulative minimum energy M is computed, using the equation 7, where e(i, j) is the energy of pixel at (i, j).

$$M(i,j)=e(i,j)+\min(M(i-1,j-1),M(i-1,j),M(i-1,j+1)) \quad (7)$$

Figure 2C:
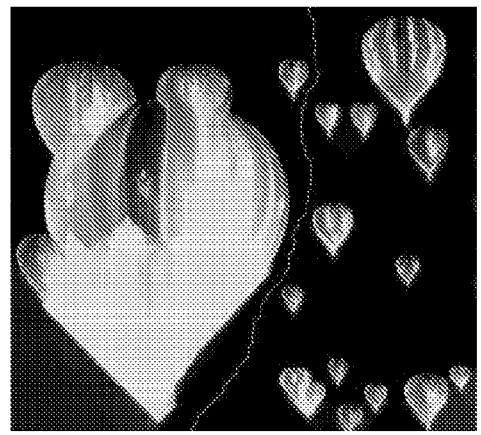

At the end of this process, the minimum value of the last row in M indicates the end of the minimal connected vertical seam. From this minimum entry, the path of the optimal seam can be traced backwards. FIG. 2C shows the cumulative minimum energy map for the energy map in FIG. 2B.

The definition for M for horizontal seams is the same with columns substituted as rows:

$$M(i,j)=e(i,j)+\min(M(i-1,j-1),M(i,j-1),M(i+1,j-1)) \quad (8)$$

Now that the optimal vertical seam is found, the n×m image is retargeted to a new size of n×(m−1) by removing (carving) the optimal vertical seam. By repeatedly removing seams in this manner a new size can be targeted. To enlarge an image, the optimal seam is duplicated by averaging the seam pixels with their left and right neighbors. However, when enlarging by more than one column, the same seam will be selected again and again, which will cause a stretching effect. Hence for enlarging a set of seams are analyzed before the process of duplicating them.

The way to calculate pixel energy is thus at the core of seam carving.

In order to achieve effective retargeting, human perception needs to be considered. Our eye tends to perceive structures in images and recognize familiar objects. Our eye is capable of combining information at different scales and also can suppress fine-scale details when needed. For instance, when looking at a table made of wood, we automatically disregard its fine-scale texture in our everyday life. Organization at multiple scales is our way of simplifying the complicated environment before us.

To simulate the human perception, the energy function takes into account also the multiple scales by integrating, or disregarding fine-scale texture.

Since the aim is to suppress finer patterns corresponding to high spatial frequencies, a blurring or a low pass filter is privileged. It has been established that within the class of convolution transformation, Gaussian kernel has the advantage to not generate artifacts by smoothing. Gaussian smoothing kernel of standard deviation σ of 5 gives good results. However, it should be noted that the value for σ need not be strictly 5 and could be tuned keeping in mind the intention of smoothing is to block out the finer details and extract regions of interest. Choosing a smaller value for σ will mean giving importance to fine details and very high values for σ will mean neglecting sizable amount of detail, focusing strictly on bigger objects.

The energy function can thus be redefined as a combination of fine scale gradient of image with normalized gradient at a coarser scale, giving higher weight to the coarser scale and using the finer scale only where coarser scale had nothing to add. The improved energy function now looks like:

$$e_{multiscale}(x, y) = e_{fine}(x, y) + \sigma * \left( \left| \frac{\partial G(I(x, y), \sigma)}{\partial x} \right| + \left| \frac{\partial G(I(x, y), \sigma)}{\partial y} \right| \right) \quad (9)$$

where $G(I(x, y), \sigma)$ is a convolution of a grey-scale image I with a 2D Gaussian smoothing function with standard deviation of σ.

In general most of the image analysis is done on the luminance channel. However when trying to interpret the contents of an image, color cannot be discarded. Color does play an important role in object identification and recognition in the human visual system. Learning from the importance of color in object segmentation, it appears that color gradients emphasize the object boundaries. Due to high sensitivity of human perception to the edges and contours, the exact extraction of object boundaries and preserving the same could provide additional visual cues for better retargeting.

Also as the aim is to emphasize object boundaries and not the color features of fine details, only color gradients at coarser scale are used. There exist several choices of the color space for image segmentation. To separately treat luminance and color channels, the YCbCr color space is used. Equation 10 defines the energy function for a coarser scale analysis of image.

$$e_{color}(x, y) = \sigma * \left( \left| \frac{\partial G(I_{Cr}(x, y), \sigma)}{\partial x} \right| + \left| \frac{\partial G(I_{Cr}(x, y), \sigma)}{\partial y} \right| + \left| \frac{\partial G(I_{Cb}(x, y), \sigma)}{\partial x} \right| + \left| \frac{\partial G(I_{Cb}(x, y), \sigma)}{\partial y} \right| \right) \quad (10)$$

Where G is a 2D Gaussian smoothing function with standard deviation σ=5.

The focus of the image or the region of interest is often around the center in most images. When defining the energy map of an image, edges and hence the objects around the center could be given more importance. Distortion of objects towards the boundaries of image could be less annoying compared to distortion of objects around the center.

The energy of every pixel is thus weighted with respect to its spatial position in the image. Let $(x_c, y_c)$ be the center of an image I with n rows and m columns. Suppose $d_E((x, y), (x_c, y_c))$ is the Euclidean distance between the pixel p at (x, y) and the center $(x_c, y_c)$. The maximum distance $maxd_E$ will be between one of the corners of the image and its center and can be defined as in equation 11. To give greater importance to the visually salient features in the center compared to those towards the boundaries the energy map $w_{spatial}$ is weighted as:

$$maxd_E = \sqrt{(n/2)^2 + (m/2)^2} \quad (11)$$

$$w_{spatial}(x, y) = 1 - \left( \frac{d_E((x, y), (x_c, y_c))}{maxd_E} \right)^2 \quad (12)$$

Figure 3:
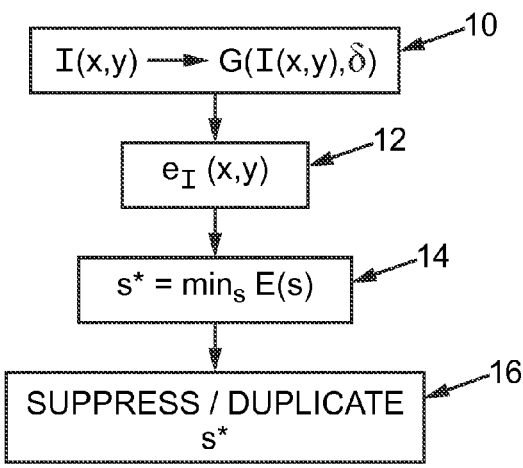
FIG. 3 is a flow chart of another method according to one embodiment of the present invention.

To summarize, a method for retargeting a source image defined by a matrix of pixels, comprises, FIG. 3:
  calculating, at step 10, a smoothed image of the source image by applying a low pass filter;
  defining, at step 12, for each pixel an energy value as a weighted sum of a first gradient function applied to the pixel and a second gradient function applied to the corresponding pixel of the smoothed image;

selecting, at step 14, a seam of least energy value among a set of seams, wherein a seam is a continuous path of pixels from one side to the opposite side of the image and its energy value is equal to the sum of the energy value of its pixels;

suppressing or duplicating, at step 16, the selected seam in the source image to modify its aspect ratio.

Figure 4:
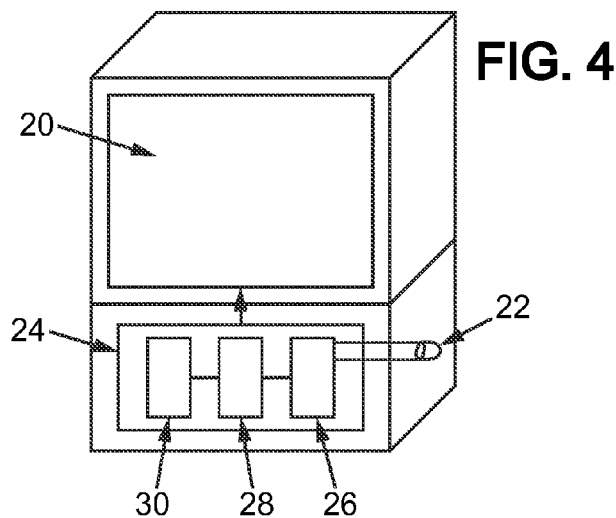
FIG. 4 is a schematic view of a TV set implementing a system according to another embodiment of the invention.

The method may be implemented into a TV set, FIG. 4, comprising a display 20 with a first aspect ratio and an input device 22 for receiving a source image having a second aspect ratio different from the first aspect ratio. For instance, a 16:9 wide screen TV on which a 4:3 video needs to be displayed.

The TV set comprises an apparatus 24 for retargeting the source image into a target image having the first aspect ratio to be displayed.

The apparatus 24 comprises:

a first calculator 26 of a color frequency distribution of the image; connected to a second calculator 28 of an energy value for each pixel, the energy value being a weighted function of the color frequency of the pixel, so as to define an image saliency map; connected to an image modifier 30 for transforming the image, the transformation being based on the pixel energy value.

The image modifier 30 may comprise a selector of a seam of least energy value among a set of seams and the image modifier 30 suppresses or duplicates the selected seam in the image to modify its aspect ratio.

The apparatus may be implemented by using a programmable computer and a computer software product stored on a recording media and comprising a set of instructions to enable a computer to practice the disclosed methods when the computer executes the set of instructions. However, due to the highly parallelism of each operations, and the high throughput required specifically by video processing, the man skilled in the art may implement advantageously the system into a specific hardware component such as a FPGA (Field Programmable Gate Arrays) or by using some specific digital signal processor.

While the invention has been illustrated and described in details in the drawings and foregoing description, such illustration and description are to be considered illustrative or exemplary and not restrictive; the invention is not limited to the disclosed embodiment.

For instance, seam carving using the energy functions disclosed here above is applicable to video by defining a 2D seam surface in a 3D video space-time cube. The intersection of the surface with each frame defines a seam in the sense of the document. The manifold seam surface allows the seam to change adaptively over time, maintaining temporal coherence. Therefore, the term "image" used in this document includes also video frame.

The man skilled in the art understands that the different energy functions disclosed here may be used alone or in combination depending on the type of image to target.

The apparatus may also be external to the TV set, and for instance, be a part of a set-top base.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. Method for modifying an image, said image being defined by a matrix of pixels, comprising:
   calculating a color frequency distribution of said matrix of pixels;
   defining for each pixel an energy value as a weighted function of the color frequency of said pixel, so as to define a saliency map of said image;
   transforming said image, said transformation being based on said pixel energy values.

2. Method according to claim 1, wherein said transformation transforms said image into a retargeted image having a different aspect ratio.

3. Method according to claim 1, wherein each pixel energy value is weighted in inverse proportion of the color frequency of said pixel.

4. Method according to claim 3, wherein the pixel energy value is weighted by a predetermined parameter when the color frequency is below a predetermined threshold.

5. Method according to claim 1, wherein the pixel energy value is weighted with respect to the spatial position of said pixel in said image.

6. Method according to claim 5, wherein the pixel energy value is weighted by the inverse of the distance of the pixel from the image center.

7. Method according to claim 1, wherein a smoothed image is calculated by applying a low pass filter to said image and the pixel energy value is weighted by a gradient function applied to the corresponding pixel of the smoothed image.

8. Method according to claim 7, wherein the low pass filter is a 2D Gaussian smoothing function.

9. Method according to claim 8, wherein the smoothing is comprised between 4 and 6.

10. Method according to claim 7, wherein, each pixel comprising at least a luminance value and a chrominance value, the gradient function is based on said pixel luminance.

11. Method according to claim 7, wherein, each pixel comprising at least a luminance value and a chrominance value, the gradient function is based on said pixel chrominance.

12. Method according to claim 2, wherein the transformation of said image into a retargeted image comprises:
   selecting a seam of least energy value among a set of seams wherein a seam is a continuous path of pixels from one side to the opposite side of the image and its energy value is equal to the sum of the energy value of its pixel;
   suppressing or duplicating said selected seam in said image to modify its aspect ratio.

13. Computer software product stored on a recording media and comprising a set of instructions to enable a computer to practice the method according to claim 1 when the computer executes said set of instructions.

14. Apparatus for modifying an image, said image being defined by a matrix of pixels, comprising:
   a first calculator of a color frequency distribution of said image; connected to
   a second calculator of an energy value for each pixel, said energy value being a weighted function of the color frequency of said pixel, so as to define a saliency map of said image; connected to
   an image modifier for transforming said image, said transformation being based on said pixel energy value.

15. TV set comprising a display with a first aspect ratio and an input device for receiving at least a source image, wherein said TV further comprises an apparatus according to claim 13 for modifying said source image into a target image having the first aspect ratio to be displayed.

* * * * *